Oct. 23, 1934.　　　W. A. REICHEL　　　1,977,954

MAGNETIC COMPASS

Filed May 22, 1929

WITNESS
E. Lutz

INVENTOR
W.A. Reichel.
BY
A. B. Ravis
ATTORNEY

Patented Oct. 23, 1934

1,977,954

UNITED STATES PATENT OFFICE 1,977,954

MAGNETIC COMPASS

Wladimir A. Reichel, Philadelphia, Pa., assignor to Aircraft Control Corporation, a corporation of Pennsylvania Application May 22, 1929, Serial No. 365,000

13 Claims. (Cl. 33—225)

My invention relates to compasses of the type responsive to the earth's magnetic field and it has for its object to provide improved compensating means therefor.

When a compass of the type referred to is located near enough to a mass of magnetic material fixed in position relatively thereto, the reading of the compass is disturbed, and it is the usual practice to compensate for such disturbances. For example, with aircraft compasses, it is the custom to insert straight magnetic bars of small and varying diameters and in such way that compensation may be effected; however, as the bars of varying diameter differ in strength by steps, it requires very accurate location thereof to obtain the desired results. Furthermore, after being located, it is necessary to fasten the bars and there is always the danger that the bars will become dislocated.

In accordance with my invention, I provide compensating magnet means together with an adjustable screen to vary the effect of the field of the magnet means so as to compensate for the disturbance by the mass of magnetic material upon the earth's field influencing the compass needle.

A further object of my invention is to provide, in connection with a compass, four bar magnets arranged 90° apart and preferably, though not necessarily, radiating from the vertical axis of the needle pivot, the bar magnets having like poles disposed outwardly and like poles disposed inwardly, together with a highly permeable screen which is adjustable in right angular directions to vary the effect of such magnets on the field influencing the compass needle.

These and other objects are effected by my invention, as will be apparent from the following description and claims, taken in connection with the accompanying drawing, forming a part of this application, in which:

Figure 1:
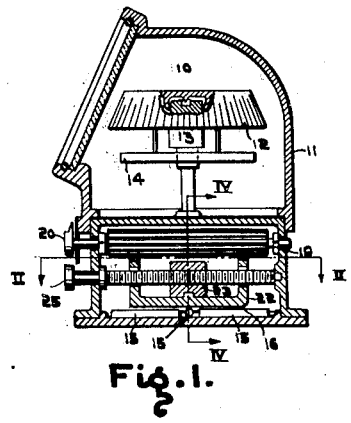
Fig. 1 is a vertical sectional view having my improved compensator applied thereto.
Figure 2:
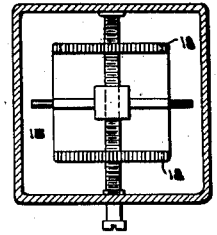
Fig. 2 is a sectional view taken along the line II—II of Fig. 1 and showing the compensator in plan.
Figure 3:
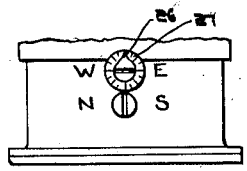
Fig. 3 is a front elevation of the compensator housing.
Figure 4:
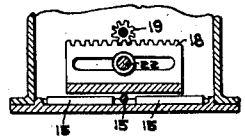
Figs. 4 and 5 are detail views of the compensator.
Figure 5:
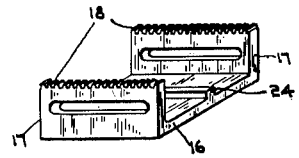

Figs. 6 to 10, inclusive, are diagrammatic views showing the principle of operation.

Referring now to the drawing more in detail, I show a compass 10 of a well known type having a housing 11 with a card and needle assembly 12 therein. The assembly is supported by a jewel bearing 13 and it is provided with magnetic needles 14 to give directive effect.

If a compass of this type is placed near to a mass of magnetic material, or is disturbed in any other way, it is necessary to compensate for the disturbance. My invention relates to improved means for securing this result.

I provide magnet means together with a screen made of material having high permeability at low field intensities, for example, alloys such as permalloy or hypernick, for varying the effect of compensating magnet means upon the field influencing directive movement of the compass needle. For example, in Fig. 1, I show four bar magnets 15 arranged 90° apart together with a screen 16 arranged between such magnets and the compass needle assembly 12 and adjustable to vary the effect of the magnets upon the field influencing directive movement of the needle assembly.

Figure 6:
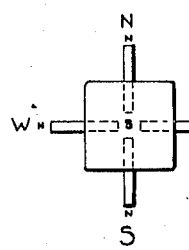

Referring to Figs. 6 to 9, inclusive, it will be noted that the magnets 15 have their north poles disposed outwardly and their south poles disposed inwardly and that the screen 16 is of such size that it may cover the magnets in various ways. In Fig. 6, the screen 16 occupies a neutral or central position in which the field of magnets exerts a uniform effect.

Figure 7:
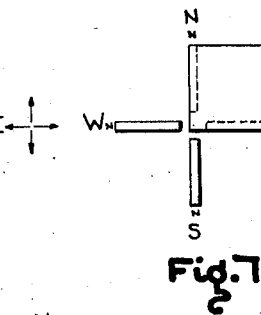
Figure 8:
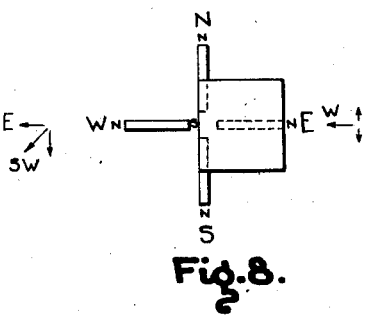
Figure 9:
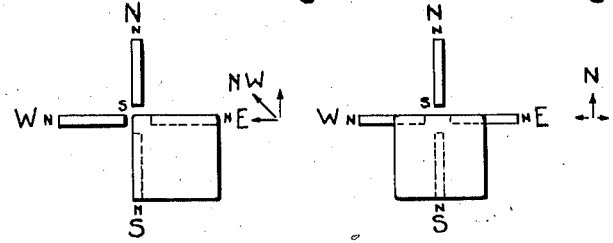
Figure 10:
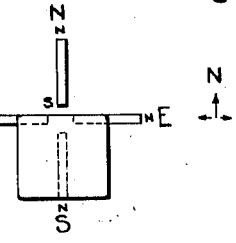

Fig. 7 shows the "N" and "E" magnets 15 covered, leaving the "W" and "S" magnets exerting a resultant "SW" effect. Fig. 8 shows the "E" magnet covered and the "N" and "S" magnets partly covered, whereby the resultant is in the direction of "W", "N" and "S" neutralizing each other. Figs. 9 and 10 are similar in principle to Figs. 7 and 8, respectively. With the magnets disposed in this way and with the screen movable in the directions of the length of all the magnets, the effect of the field of the magnets may be changed as desired.

The screen is moved in directions at right angles by any suitable means, the means being so arranged that one does not interfere with movement of the other. For example, the screen 16 has upstanding flanges 17 whose upper edges are provided with racks 18 engaging the long pinion 19 turned by the head 20 to move the screen normally with respect to the pinion; and motion at right angles is secured by the screw 22 engaging a nut 23 having a slidable key connection 24 at right angles to the pinion. If the screen is traversed by the screw and nut mechanism, the racks slide along the pinion. On the other hand, if the screen is traversed by the rack and pinion mechanism the nut 23 slides on key connection 24.

Hence, by operating one of the heads 20 or 25, or both, the screen may be caused to occupy any desired position.

The magnets 15 are mounted on a suitable base 25 having radiating grooves 26 therefor, the magnets preferably being held in the grooves or seats in any suitable manner.

Compensation of the instrument is facilitated owing to the fact that the operating elements of the screen are arranged close together at the front. Also the rack and pinion connection provides for the ready application of an indicator to show the position of the screen relatively to the vertical plane of the pinion axis. This will be evident when the preferred mode of compensation is considered. The apparatus upon which the compass is mounted is first moved so that the compass should indicate, for example, north, with the screen symmetrical with respect to east and west, or the vertical plane of the pinion axis. The screw 22 is then turned and the screen moved in a north and south direction until compensation is effected. Next, the apparatus is turned 90°, or east and west, and compensation is effected by operating the pinion. In this way, the disturbance to the earth's field by magnetic material is compensated for in directions at right angles. With this arrangement, when the screen is adjusted by the screw-and-nut mechanism, the screen exerts a neutral effect if it is first placed in symmetrical position with respect to the pinion axis. With the screen in this position, compensation is effected by operation of the screw-and-nut mechanism; and, thereafter, the apparatus is turned 90° and compensation is made by adjusting the rack and pinion mechanism. The pinion is provided with an indicator 26 cooperating with suitable indicia on a dial 27 to indicate the position of the screen with reference to the pinion axis.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with a compass responsive to the earth's magnetic field, of a compensator therefor including bar magnets arranged at right angles, a single highly permeable screen for the magnets, and means for moving the screen along either or both magnets to adjust the compensating effect of the latter.

2. The combination with a compass responsive to the earth's magnetic field, of a compensator therefor including radially arranged bar magnets spaced 90° apart; a highly permeable screen of a size capable of covering one or two adjoining magnets and, when in central position, of covering portions of all of the magnets; and means for imparting movement to the screen in the directions of length of the magnets to adjust the compensating effect.

3. The combination with a compass responsive to the earth's magnetic field, of a compensator therefor including four bar magnets arranged radially with respect to the vertical axis of the compass needle pivot and spaced 90° apart, a rectangular highly permeable screen arranged between the compass needle and the bar magnets and adjacent to the latter, and means for moving the screen in the directions of length of the magnets to adjust the compensating effect.

4. The combination with a compass responsive to the earth's magnetic field, of a compensator therefor including four bar magnets arranged radially with respect to the vertical axis of the compass needle pivot and spaced 90° apart, the like pole ends of the magnets being disposed outwardly, a rectangular high permeable screen arranged between the compass needle and the bar magnets and adjacent to the latter, and means for moving the screen in the direction of length of either or both oppositely disposed pairs of magnets to adjust the compensating effect.

5. The combination with a compass responsive to the earth's magnetic field having a needle assembly, of a compensator therefor including four bar magnets arranged radially and spaced 90° apart, the north pole ends of the magnets being disposed outwardly and the south pole ends being disposed inwardly, or vice versa, the magnets being arranged in two aligned pairs, a rectangular highly permeable screen having one pair of opposed sides arranged parallel to one pair of aligned magnets and of less length than the overall length of the latter and the other pair of opposed sides arranged parallel to the other pair of aligned magnets and of less length than the overall length of the latter, and means for moving the screen in right angular directions parallel to the sides thereof.

6. The combination with a compass responsive to the earth's magnetic field, of means therefor for compensating for local disturbance of the earth's field by magnetic material including magnet means comprising four magnets arranged in pairs at right angles to each other, a single highly permeable screen disposed at the compass side of the magnet means, and means for moving the screen in either or both of said directions at right angles to vary the compensating effect of said magnets on the compass.

7. The combination with a compass responsive to the earth's magnetic field, of means therefor for compensating for local disturbance of the earth's field by magnetic material including magnet means comprising four magnets arranged in pairs at right angles to each other, a single highly permeable screen disposed at the compass side of the magnet means, means for moving the screen in either or both of said directions at right angles, and means for indicating the position of the screen with respect to one direction of movement.

8. The combination with a compass responsive to the earth's magnetic field, of a compensator therefor including magnet means comprising four magnets arranged in pairs at right angles to each other, a single highly permeable screen movable over the magnet means in either or both of said directions at right angles, rack and pinion mechanism for moving the screen in the first direction, and screw and nut mechanism for moving the screen in the second direction at right angles to the first.

9. The combination with a compass responsive to the earth's magnetic field, of a compensator therefor including magnet means comprising four magnets arranged in pairs at right angles to each other, a single highly permeable screen movable over the magnet means in either or both of said directions at right angles, rack and pinion mechanism for moving the screen in the first direction, screw and nut mechanism for moving the screen in the second direction at right angles to the first, and an indicator operative to show the position of the screen with respect to the first direction.

10. The combination with a compass responsive to the earth's magnetic field, of a compensator magnet means therefor including four radially arranged magnets having like poles disposed outwardly and like poles disposed inwardly, a highly permeable screen partially covering the magnet means, means for moving the screen in a first direction, and means for moving the screen in a second direction at right angles to the first direction.

11. The combination with a compass responsive to the earth's magnetic field, of compensator magnet means therefor including four radially arranged magnets having like poles disposed outwardly and like poles disposed inwardly, a highly permeable screen partially covering the magnet means, rack means on the screen, a nut having a splined connection with respect to screen, the splined connection being disposed parallel to the rack, a screw engaging the nut to move the screen, and a pinion meshing with the rack and of sufficient length to mesh with the rack for all positions to which the screen may be adjusted by the screw and nut.

12. An apparatus for neutralizing external influences on a given magnetic field, comprising means having a plurality of magnetic fields, a single magnetic screen associated with said plurality of fields, and means for moving said screen from the same location in directions at right angles to each other to adjust the compensating effect of said plurality of fields, said moving means including rotatable shafts parallel to each other and arranged to be actuated from adjacent ends thereof, one of said shafts being threaded externally and cooperating with an internally threaded member carried by said screen, and the other of said shafts having a pinion thereon cooperating with a rack carried by said screen.

13. A device for compensating magnetic compasses, comprising a casing, two sets of coupled magnets supported in said casing, one set being at right angles to the other, a single magnetic screen for said magnets, and a pair of rotatable parallel shafts for moving said screen in either or both of two directions at right angles to each other from the same side of the casing to adjust the compensating effect of the magnets, one of said shafts being externally threaded and cooperating with an internally threaded member carried by the screen, and the other of said shafts having a pinion thereon cooperating with a rack carried by the screen.

WLADIMIR A. REICHEL.